US008164614B2

(12) United States Patent
Carter

(10) Patent No.: US 8,164,614 B2
(45) Date of Patent: *Apr. 24, 2012

(54) COMMUNICATION AND MONITORING SYSTEM

(75) Inventor: Ronald Carter, Matthews, NC (US)

(73) Assignee: Revolutionary Concepts, Inc., Matthews, NC (US)

(*) Notice: Subject to any disclaimer, the term of this patent is extended or adjusted under 35 U.S.C. 154(b) by 1079 days.

This patent is subject to a terminal disclaimer.

(21) Appl. No.: 11/929,464

(22) Filed: Oct. 30, 2007

(65) Prior Publication Data

US 2008/0117299 A1     May 22, 2008

Related U.S. Application Data

(63) Continuation of application No. 11/618,615, filed on Dec. 29, 2006, which is a continuation-in-part of application No. 10/682,185, filed on Oct. 9, 2003, now Pat. No. 7,193,644.

(60) Provisional application No. 60/418,384, filed on Oct. 15, 2002.

(51) Int. Cl.
*H04N 7/14* (2006.01)
(52) U.S. Cl. ................. 348/14.06; 379/102.06
(58) Field of Classification Search ............... 348/14.02, 348/14.06; 379/102.06, 102.01
See application file for complete search history.

(56) References Cited

U.S. PATENT DOCUMENTS

| 4,804,945 A | 2/1989 | Millet |
| 4,931,789 A | 6/1990 | Pinnow |
| 5,031,228 A | 7/1991 | Lu |
| 5,148,468 A | 9/1992 | Marrick |
| 5,303,300 A | 4/1994 | Eckstein |
| 5,406,618 A | 4/1995 | Knuth et al. |
| 5,428,388 A | 6/1995 | von Bauer et al. |

(Continued)

FOREIGN PATENT DOCUMENTS

WO       02096097 A1       11/2002

OTHER PUBLICATIONS

"3006 Doorphone Trunk Port", publicly accessed via the Internet on May 13, 2002, <http://www.algosolutions.com/product/3006.htm>.

(Continued)

*Primary Examiner* — Stella Woo
(74) *Attorney, Agent, or Firm* — Tillman Wright, PLLC; Chad D. Tillman; Jeremy C. Doerre

(57) ABSTRACT

An audio-video communication system comprises a wireless exterior module located proximate an entrance, a computerized controller running a software application, and a remote peripheral device. The wireless exterior module includes a proximity sensor for detecting a person at the entrance, a video camera for recording an image of the person at the entrance, a microphone for recording the person at the entrance, a speaker for playing audio to the person at the entrance, a transmitter for communicating sounds and images of the person at the entrance, and a receiver for receiving communications at the wireless exterior module. The computerized controller is disposed in wireless electronic communication with the wireless exterior module via the transmitter and the receiver of the wireless exterior module. The remote peripheral device is configured to electronically communicate with the computerized controller for viewing an image from the video camera communicated from the wireless exterior module.

20 Claims, 12 Drawing Sheets

U.S. PATENT DOCUMENTS

| | | | |
|---|---|---|---|
| 5,657,380 | A | 8/1997 | Parsadayan et al. |
| 5,896,165 | A | 4/1999 | Rao |
| D413,541 | S | 9/1999 | Kaiser |
| 5,966,432 | A | 10/1999 | Buckler et al. |
| 6,041,106 | A | 3/2000 | Parsadayan et al. |
| 6,049,598 | A | 4/2000 | Peters et al. |
| 6,094,213 | A | 7/2000 | Mun et al. |
| 6,185,294 | B1 | 2/2001 | Chornenky et al. |
| 6,233,328 | B1 | 5/2001 | Wolf |
| 6,317,489 | B1 | 11/2001 | Parsadayan |
| 6,324,261 | B1 * | 11/2001 | Merte .................. 379/102.06 |
| 6,356,192 | B1 | 3/2002 | Menard |
| 6,429,893 | B1 | 8/2002 | Xin |
| 6,438,221 | B1 | 8/2002 | Lee et al. |
| 6,445,777 | B1 | 9/2002 | Clark |
| 6,466,261 | B1 | 10/2002 | Nakamura |
| 6,504,470 | B2 | 1/2003 | Puchek et al. |
| 6,509,924 | B2 | 1/2003 | Honguu et al. |
| 6,759,956 | B2 | 7/2004 | Menard et al. |
| 6,762,788 | B2 | 7/2004 | Chang |
| 6,778,084 | B2 | 8/2004 | Chang et al. |
| 7,015,943 | B2 | 3/2006 | Chiang |
| 7,015,946 | B2 | 3/2006 | Suzuki |
| 7,046,268 | B2 | 5/2006 | Saburi |
| 7,088,233 | B2 | 8/2006 | Menard |
| 7,136,458 | B1 | 11/2006 | Zellner et al. |
| 7,162,281 | B2 | 1/2007 | Kim |
| 7,193,644 | B2 | 3/2007 | Carter |
| D548,736 | S | 8/2007 | Arseneau et al. |
| 7,353,042 | B2 | 4/2008 | Yamagishi |
| 7,532,709 | B2 * | 5/2009 | Styers et al. ............. 379/102.01 |
| 7,583,191 | B2 * | 9/2009 | Zinser ............................. 340/541 |
| 7,657,920 | B2 | 2/2010 | Arseneau et al. |
| 7,839,985 | B2 | 11/2010 | Shim |
| 2002/0050932 | A1 | 5/2002 | Rhoades |
| 2004/0004536 | A1 | 1/2004 | Noma et al. |
| 2004/0032495 | A1 | 2/2004 | Ortiz |
| 2004/0068743 | A1 | 4/2004 | Parry et al. |
| 2004/0078825 | A1 | 4/2004 | Murphy |
| 2005/0050575 | A1 | 3/2005 | Arseneau |
| 2005/0190900 | A1 | 9/2005 | White et al. |
| 2006/0174297 | A1 | 8/2006 | Anderson et al. |
| 2007/0018952 | A1 | 1/2007 | Arseneau et al. |
| 2007/0019068 | A1 | 1/2007 | Arseneau et al. |
| 2007/0019069 | A1 | 1/2007 | Arseneau et al. |
| 2007/0021055 | A1 | 1/2007 | Arseneau et al. |
| 2007/0021056 | A1 | 1/2007 | Arseneau et al. |
| 2007/0021057 | A1 | 1/2007 | Arseneau et al. |
| 2007/0021058 | A1 | 1/2007 | Arseneau et al. |
| 2007/0022438 | A1 | 1/2007 | Arseneau et al. |
| 2007/0022445 | A1 | 1/2007 | Arseneau et al. |
| 2007/0022446 | A1 | 1/2007 | Arseneau et al. |
| 2007/0022447 | A1 | 1/2007 | Arseneau et al. |
| 2007/0058041 | A1 | 3/2007 | Arseneau et al. |
| 2007/0103541 | A1 | 5/2007 | Carter |
| 2007/0103542 | A1 | 5/2007 | Carter |
| 2007/0103548 | A1 | 5/2007 | Carter |
| 2007/0132844 | A1 | 6/2007 | Katz |
| 2007/0240190 | A1 | 10/2007 | Arseneau et al. |
| 2008/0117299 | A1 | 5/2008 | Carter |
| 2008/0136908 | A1 | 6/2008 | Carter |
| 2011/0032360 | A1 | 2/2011 | Carter et al. |

OTHER PUBLICATIONS

"New Invention Provides Security and Convenience", The Cape Fear Messenger, newspaper article published on Mar. 30, 1988.

"Wireless-G Internet Video Camera—Model No. WVC54G—Send live video and audio to a web browser anywhere in the world!", Linksys a division of Cisco Systems, Inc. Product Data Sheet, Copyright 2004 Cisco Systems, Inc.

"Nortel Venture wired phone system", publicly accessed via the Internet on May 13, 2002, <http://shop.store.yahoo.com/phonesystem/norvanwirsys.html>.

"Doorphone", publicly accessed via the Internet on May 13, 2002, <http://www.smarthone.com/images/5079dgmbig.jpg>.

"Venture Specifications", publicly accessed via the Internet on May 13, 2002, <http://www.gd-wts.com/widts/Vendor%20Info/venture.htm>.

Information Disclosure Statement (IDS) Letter Regarding Common Patent Application(s) dated Jan. 1, 2012.

Wireless Lan Service at the new PGE Park, last edited Mar. 19, 2005, http://wiki.peronaltelco.net/index.cgi/PgePark, 4 pages.

* cited by examiner

COMMUNICATION AND MONITORING SYSTEM

I. CROSS REFERENCE TO RELATED APPLICATION

This application is a continuation patent application of, and claims the benefit under 35 U.S.C. §120 to, U.S. patent application Ser. No. 11/618,615, filed Dec. 29, 2006, published as U.S. Patent Appl. Publication No. 2007/0103548 A1, which patent application is a continuation-in-part patent application of, and claims the benefit under 35 U.S.C. §120 to, U.S. patent application Ser. No. 10/682,185, filed Oct. 9, 2003, published as U.S. Patent Application Publication No. 2005/0285934 A1, and now granted as U.S. Pat. No. 7,193,644, which patent application is a nonprovisional patent application of U.S. patent application Ser. No. 60/418,384, filed on Oct. 15, 2002, expired. Each of these patent applications, patent application publications, and patent is hereby incorporated herein by reference.

II. BACKGROUND OF THE INVENTION

There are numerous problems presently associated with receiving visitors at a home or office. When the resident of the home or occupant of the office (hereinafter generally referred to as either resident or occupant) is absent, there is often no message for the visitors, no means to leave an interactive message for the resident, and no means to ensure that unwanted access is not obtained. Moreover, answering the call of someone at a door of a dwelling can present certain security risks to an occupant therein. This situation can be especially inconvenient when, for example, a delivery or repair person arrives and the resident is not present. When the resident is present, on the other hand, there are also problems associated with receiving visitors. Some visitors may be unwelcome, for example, and it is often not evident that a visitor is a threat or an annoyance until after the door is open.

There are many types of systems for receiving a person by an occupant or resident and/or on the behalf of the occupant or resident. Such systems include those disclosed in each of: U.S. Pat. No. 5,148,468 titled "Door Answering System", which issued Sep. 15, 1992 to Marrick et al; U.S. Pat. No. 5,303,300 titled "Security Door Phone Device," which issued Apr. 12, 1994 to Eckstein; U.S. Pat. No. 5,406,618 titled "Voice Activated, Hands Free Telephone Answering Device," which issued Apr. 11, 1995 to Knuth, et al.; and U.S. Pat. No. 5,657,380 titled "Interactive Door Answering and Messaging Device with Speech Synthesis," which issued to Mozer on Aug. 12, 1997. Nevertheless, a need remains for further improvement in such a system.

III. SUMMARY OF THE INVENTION

The invention includes many aspects and features. Moreover, while many aspects and features of the invention relate to, and are described in, the context of a system for receiving a person at an entrance, such as, an entrance to a home or business, the invention is not limited to use only in such context and may be used and has applicability in other contexts as well.

In one aspect of the invention, an audio-video communication system comprises a wireless exterior module located proximate an entrance, a computerized controller running a software application and a remote peripheral device. The wireless exterior module includes a proximity sensor for detecting a person at the entrance, a video camera for recording an image of the person at the entrance, a microphone for recording sound of the person at the entrance, a speaker for playing audio to the person at the entrance, a transmitter for communicating sounds and images of the person at the entrance, and a receiver for receiving communications at the wireless exterior module. The computerized controller is disposed in wireless electronic communication with the wireless exterior module via the transmitter and the receiver of the wireless exterior module. The computerized controller is configured to control recording of communications with the wireless exterior module and playback of such recording, and the software application includes a graphic user interface that enables a user to view images from the video camera communicated from the wireless exterior module. The remote peripheral device is configured to electronically communicate with the computerized controller for viewing an image from the video camera communicated from the wireless exterior module.

In a feature of the first aspect, the audio-video communication system further comprises a second wireless exterior module located proximate an entrance, with the second wireless exterior module having a proximity sensor for detecting a person at the entrance, a video camera for recording an image of the person at the entrance, a microphone for recording sound of the person at the entrance, a speaker for playing audio to the person at the entrance, a transmitter for communicating sounds and images of the person at the entrance, and a receiver for receiving communications at the wireless exterior module. The computerized controller running the software application is further disposed in wireless electronic communication with the second wireless exterior module via the transmitter and the receiver of the second wireless exterior module.

In another feature of this aspect, the remote peripheral device is configured to remotely actuate the camera of the wireless exterior module. In an additional feature, the graphic user interface enables a user to view streaming video with the remote peripheral device. In yet another feature, the remote peripheral device comprises a cell phone. In still yet another feature, the remote peripheral device comprises a video phone. In further features, the remote peripheral device comprises a computer and a personal digital assistant.

In an additional feature, the entrance comprises an entrance of a business. In another additional feature, the entrance comprises an entrance of a residence. In a further feature, the wireless exterior module includes a display screen. In still a further feature, the wireless exterior module includes a keypad comprising a touch screen or a keyboard. In yet a further feature, the wireless exterior module is portable and includes a locking mechanism and an electrical receptacle for quickly attaching to a source of electricity.

In another feature, the wireless exterior module has a portable energy source and is secured in a holster. In yet another feature, the computerized controller comprises a personal computer. In still yet another feature, the computerized controller is disposed in electronic communication with a public switching telephone network (PSTN).

In a further feature, the computerized controller is disposed in electronic communication with the Internet. In an additional feature, the audio-video communication system further comprises an electronically actuated lock that is configured to be unlocked by the computerized controller. In another feature, the system further comprises a voice recognition system.

In still a further feature, a transceiver includes the transmitter for communicating sounds and images of the person at the entrance and the receiver for receiving communications at the wireless exterior module. In yet another feature, the computerized controller includes an image recognition module for identifying at least one of faces, eyes, and fingerprints.

In a second aspect of the invention, a method for two-way audio-video communications between a first person at an entrance and a second person comprises the steps of (a) detecting, with a proximity sensor located proximate an entrance, the presence of a first person at the entrance; and (b) providing real time audio-video communications between the first person at the entrance and a second person using a wireless handheld device. Step (b) is done by (i) transmitting, to the wireless handheld device of the second person, video of the first person at the entrance recorded using a camera located proximate the entrance, (ii) transmitting, to the wireless handheld device of the second person, audio of the first person at the entrance recorded using a microphone located proximate the entrance, and (iii) transmitting, to a speaker located proximate the entrance for playing to the first person at the entrance, audio of the second person recorded using the wireless handheld device.

In a feature of this aspect, the transmitting includes wireless communications between both the camera and microphone located proximate the entrance and a computerized controller running a software application including a graphic user interface by which the audio-video communications between the first person and the second person are established. In another feature, the method further comprises the step of playing a recorded greeting to the first person at the entrance upon the detection of the first person at the entrance with the proximity sensor. With regard to this feature, the method further comprises determining, by a user with a remote peripheral device, the recorded greeting that is played through a graphical user interface. With further regard to this feature, the recorded greeting is selected by the user from a plurality of recorded greetings. It accordance with this feature, the recorded greetings are seasonal greetings. It is preferred that the recorded greeting includes audio and video.

In an additional feature, the method further comprises the step of posting, by the user from a remote peripheral device, a video greeting for presentation to a first person at the entrance. In further features, the wireless handheld device comprises a cell phone, a video phone, and a personal digital assistant.

In yet another feature, the entrance comprises an entrance of a business. In still a further feature, the entrance comprises an entrance of a residence. In another feature, the method further comprises the step of saving a recording of the two-way audio-communications in a database for later playback. In yet another feature, the method further comprises transmitting, to a video display located proximate the entrance for presentation to the first person at the entrance, video of the second person recorded using the wireless handheld device.

In an additional feature, the transmitting includes communications over the Internet. In further features, the transmitting includes communications over a cellular network and over a satellite network. In yet another feature, the method further comprises remotely actuating the camera located proximate the entrance using the wireless handheld device. In still further features, the step of remotely actuating the camera includes zooming an image of the first person at the entrance and remotely moving the camera to change the view of the camera.

In a third aspect of the invention, a method for receiving a person at an entrance comprises the steps of (a) detecting, with a proximity sensor located proximate an entrance, the presence of a person at the entrance; (b) transmitting, to a computerized controller running a software application, video of the person at the entrance recorded using a camera located proximate the entrance; and (c) providing, with the application software running at the computerized controller, a graphic user interface to a remote peripheral device by which a user of the remote peripheral device may view the video of the person at the entrance.

In a feature of this aspect, the method further comprises the step of saving, in accordance with the application software running at the computerized controller, the video of the person at the entrance in a database in association with a timestamp. In other features, the video is viewed using the remote peripheral device in real-time, viewed using the remote peripheral device after the person at the entrance has left, and is streamed to the remote peripheral device.

In an additional feature, the method further comprises the step of transmitting, to the computerized controller running the software application, audio of the person at the entrance recorded using a microphone located proximate the entrance; wherein the graphic user interface provided to the remote peripheral device further enables a user of the remote peripheral device to hear the audio of the person at the entrance. In another feature, the method further comprises the step of playing a recorded greeting to the person at the entrance upon the detection of the person at the entrance with the proximity sensor.

In another feature, the method further comprises determining, by a user with the remote peripheral device, the recorded greeting that is played through a graphical user interface. With regard to this feature, the recorded greeting may be selected by the user from a plurality of recorded greetings, the recorded greetings may be seasonal greetings, and the recorded greeting may include audio and video.

In yet another feature, the method further comprises the step of posting, by the user from the remote peripheral device, a video greeting for presentation to a person at the entrance. In other features, the remote peripheral device comprises a cell phone, a video phone, a computer, and a personal digital assistant. In still other features, the entrance comprises an entrance of a business and an entrance of a residence.

In still another feature, the method further comprises remotely actuating the camera located proximate the entrance using the remote peripheral device. In further features, the step of remotely actuating the camera includes zooming an image of the person at the entrance and remotely moving the camera to change the view of the camera.

In addition to the aforementioned aspects and features of the present invention, it should be noted that the present invention further encompasses the various possible combinations of such aspects and features.

IV. BRIEF DESCRIPTION OF THE DRAWINGS

One or more preferred embodiments of the invention now will be described in detail with reference to the accompanying drawings.

Figure 4:
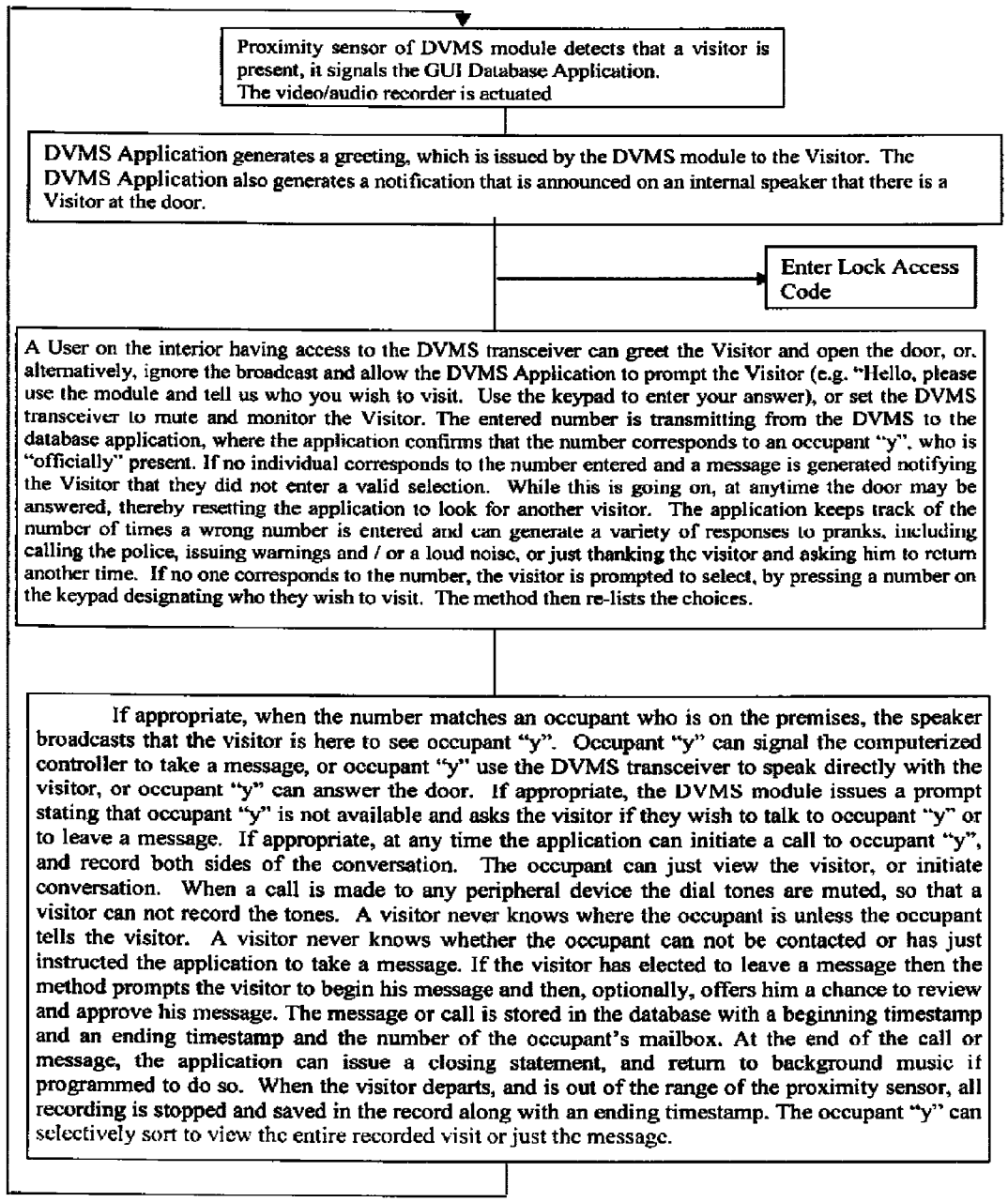
FIG. 4 is a block diagram overview of a method in accordance with a preferred embodiment of the invention.
Figure 5:
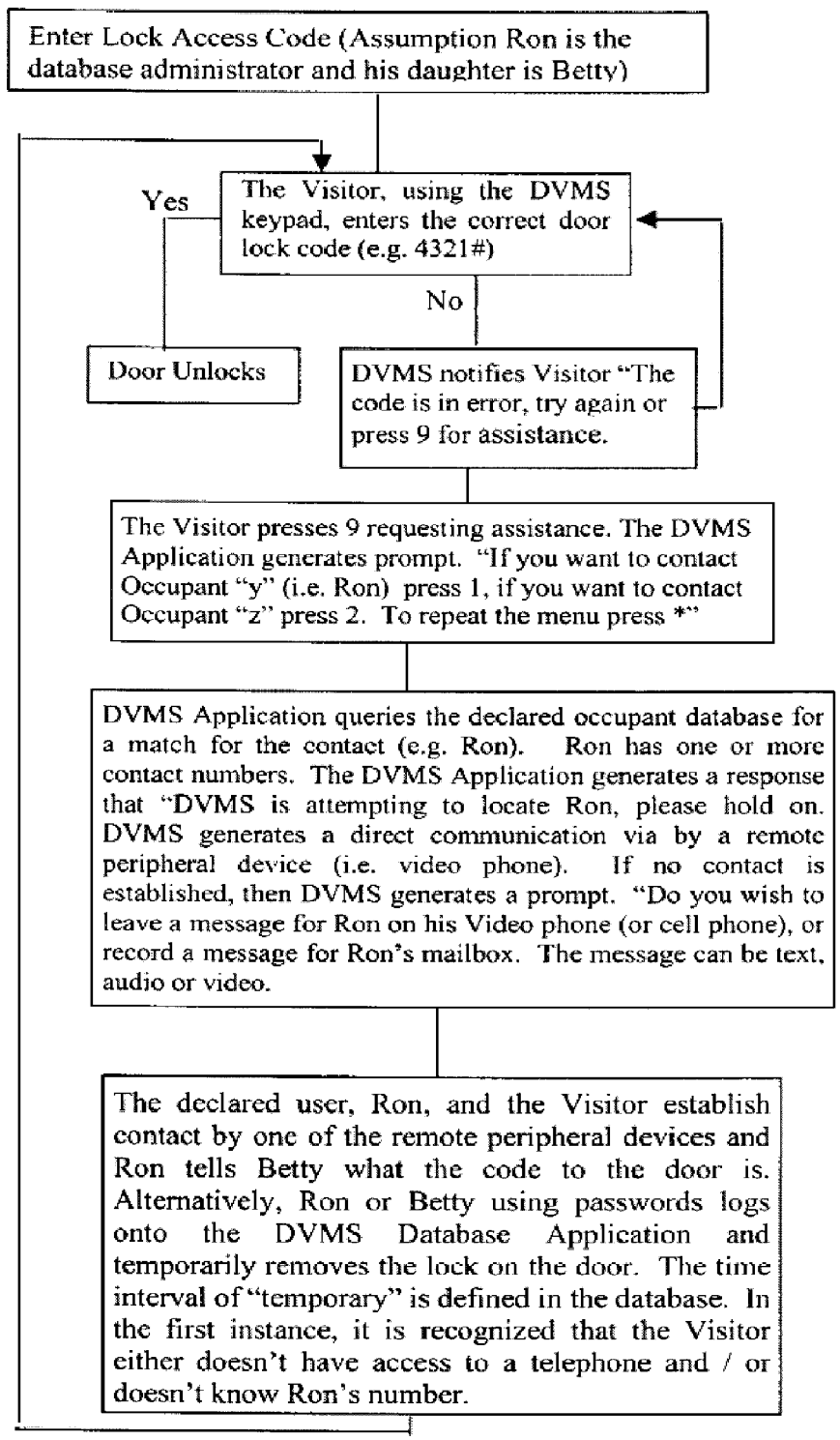

FIG. 5 a block diagram extension of the method of FIG. 4.

Figure 6:
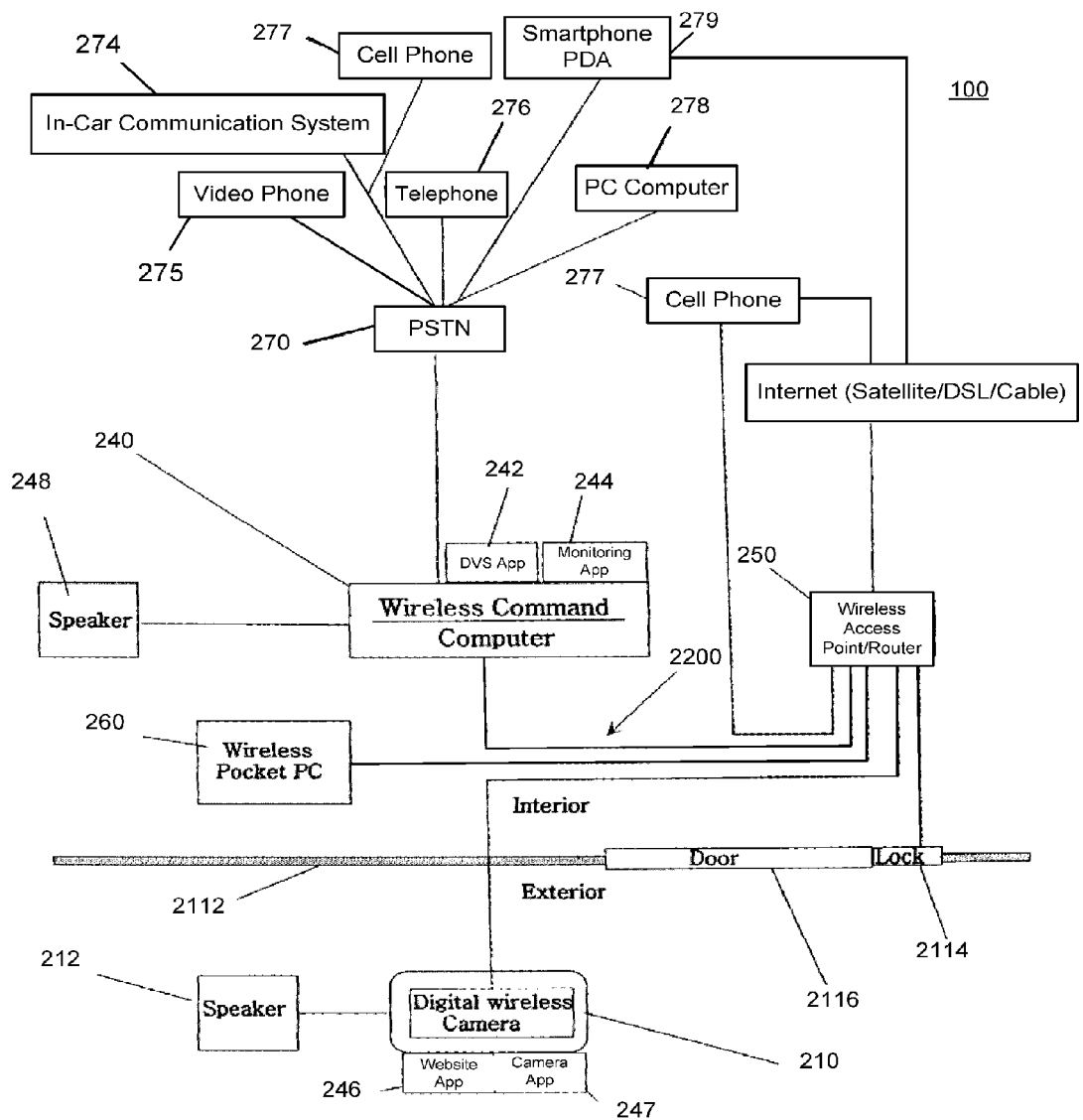

FIG. 6 is a schematic diagram of a system in accordance with another preferred embodiment of the invention.

Figure 7:
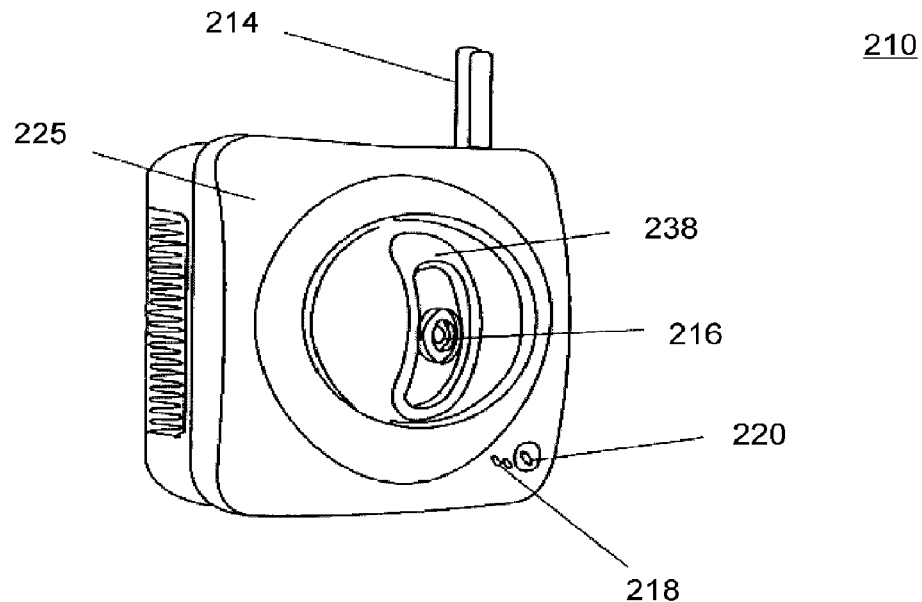

FIG. 7 is a perspective view of the front of a wireless network camera of the system of FIG. 6.

Figure 8:
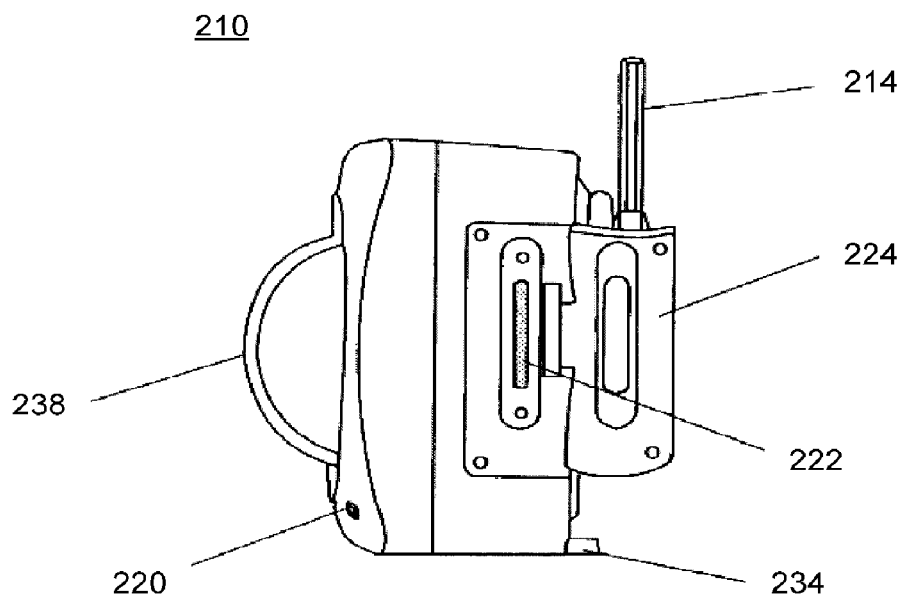

FIG. 8 is a side view of the wireless network camera of FIG. 7.

Figure 9:
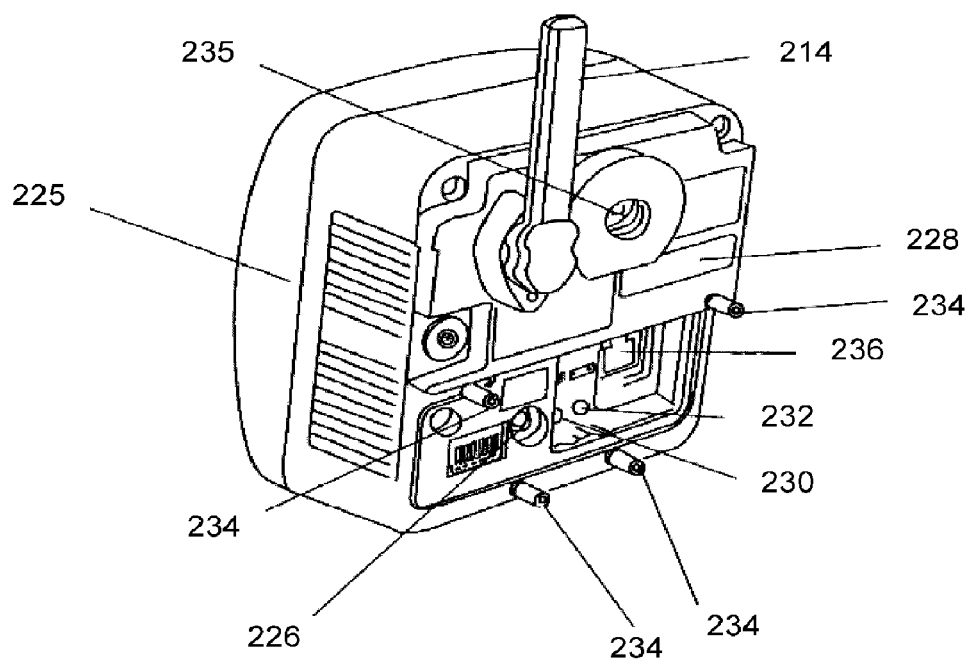

FIG. 9 is a perspective view of the rear of the wireless network camera of FIG. 7.

Figure 10:
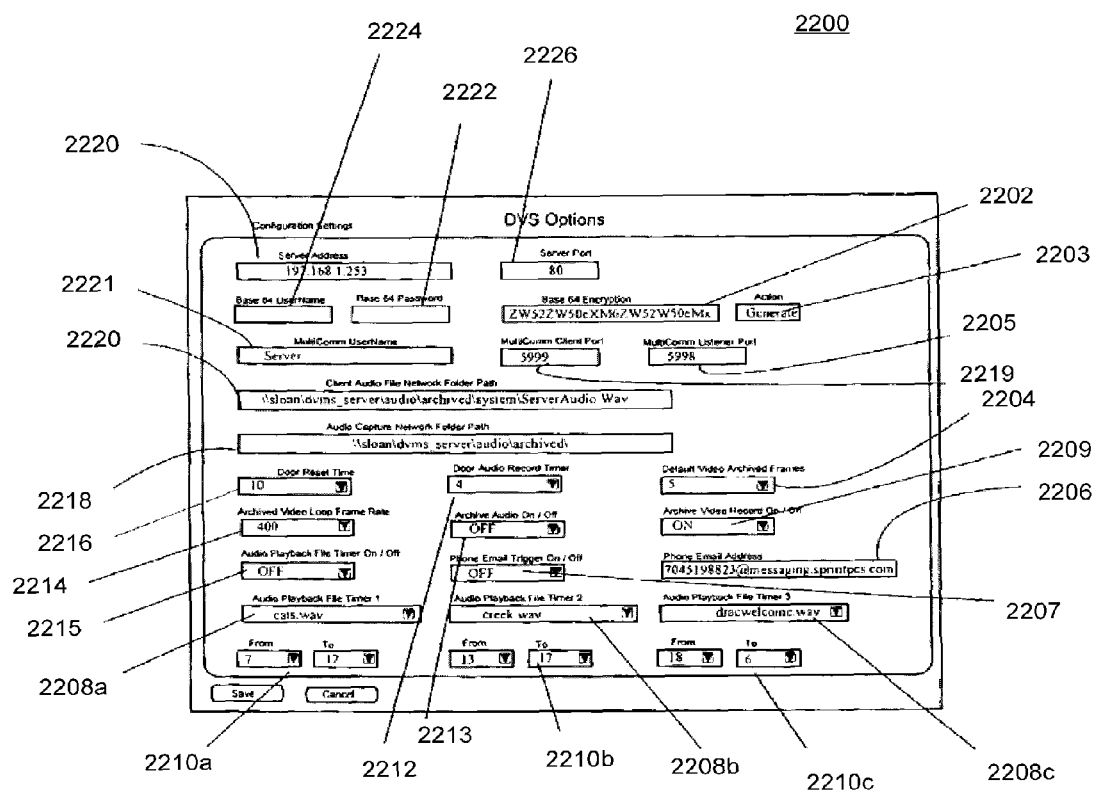

FIG. 10 is a representative screen view of a wireless command center of the system of FIG. 6, wherein various parameter settings for configuring, e.g., the audio, video, server, and cell phone options are illustrated.

Figure 11:
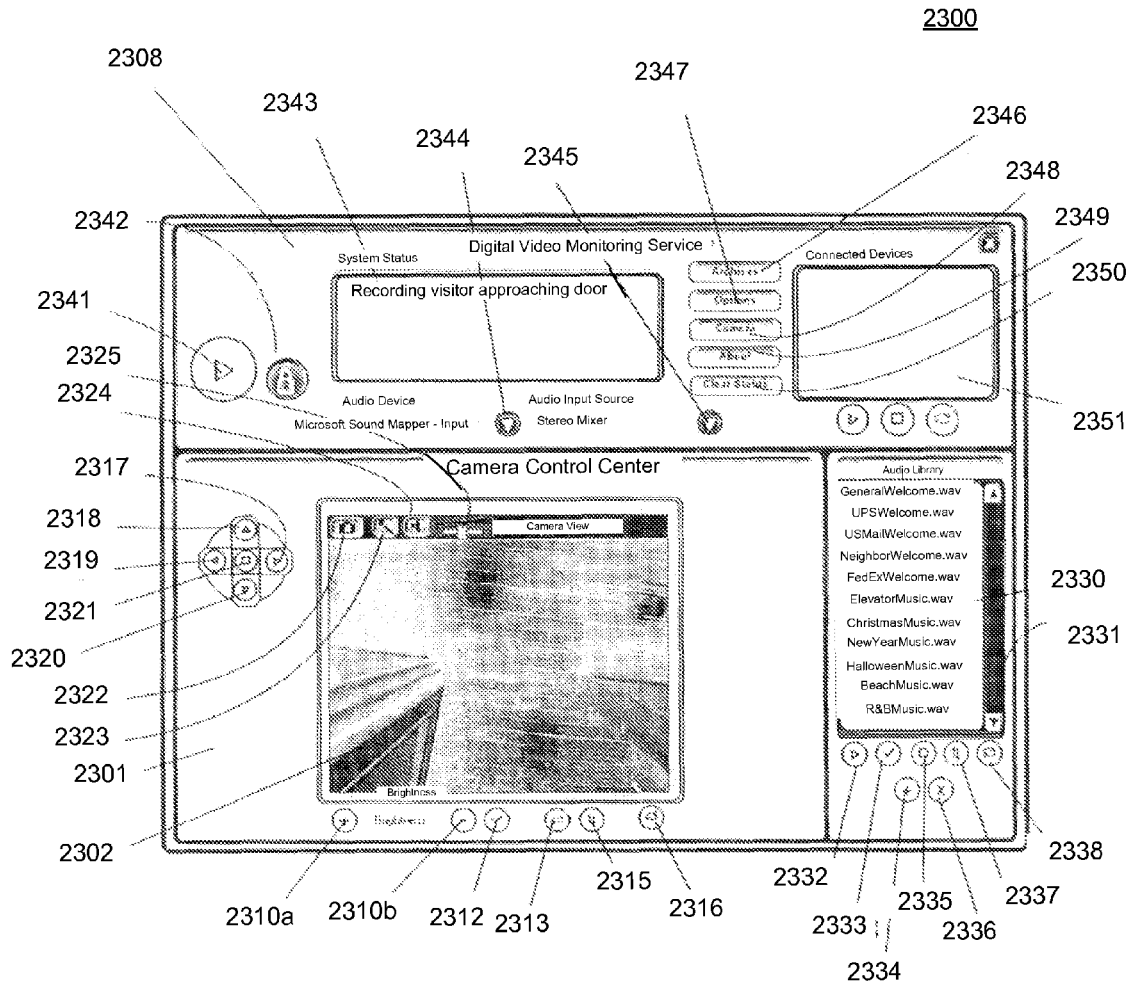

FIG. 11 is a screen view of the normal operating mode interface of the wireless command center of FIG. 10, wherein a user is able to dynamically control a wireless network camera, view video images generated by the wireless network camera, listen and send both pre-canned and live audio files, and review archived system events.

Figure 12:
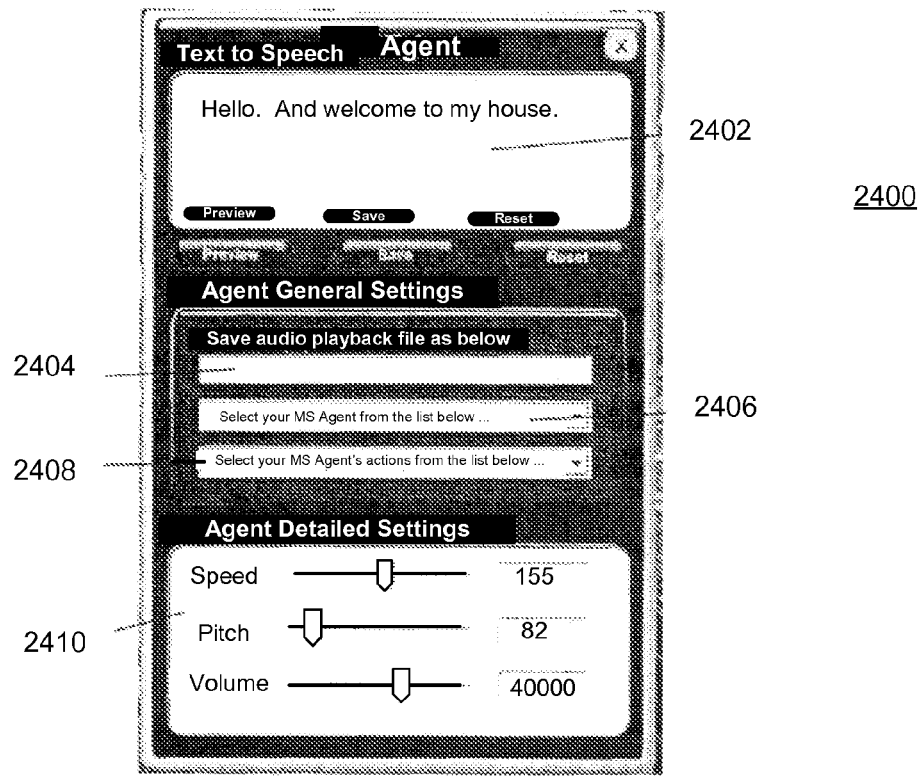

FIG. 12 is a dialog box screen view of the text-to-voice synthesizer module of the wireless command center of FIG. 10.

Figure 13:
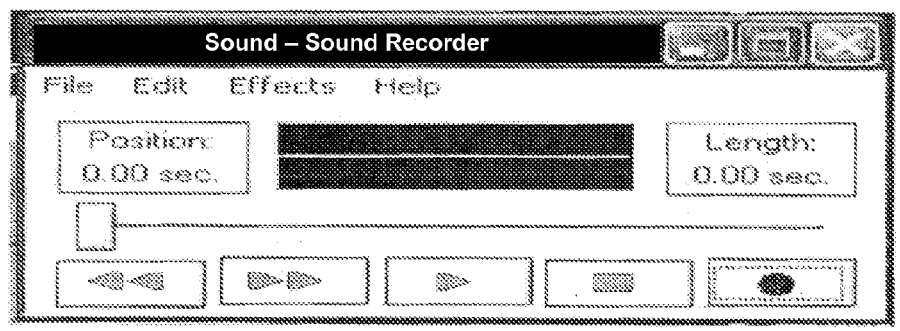

FIG. 13 is a dialog box screen view of the recorded voice synthesizer module of the wireless command center of FIG. 10.

Figure 14:
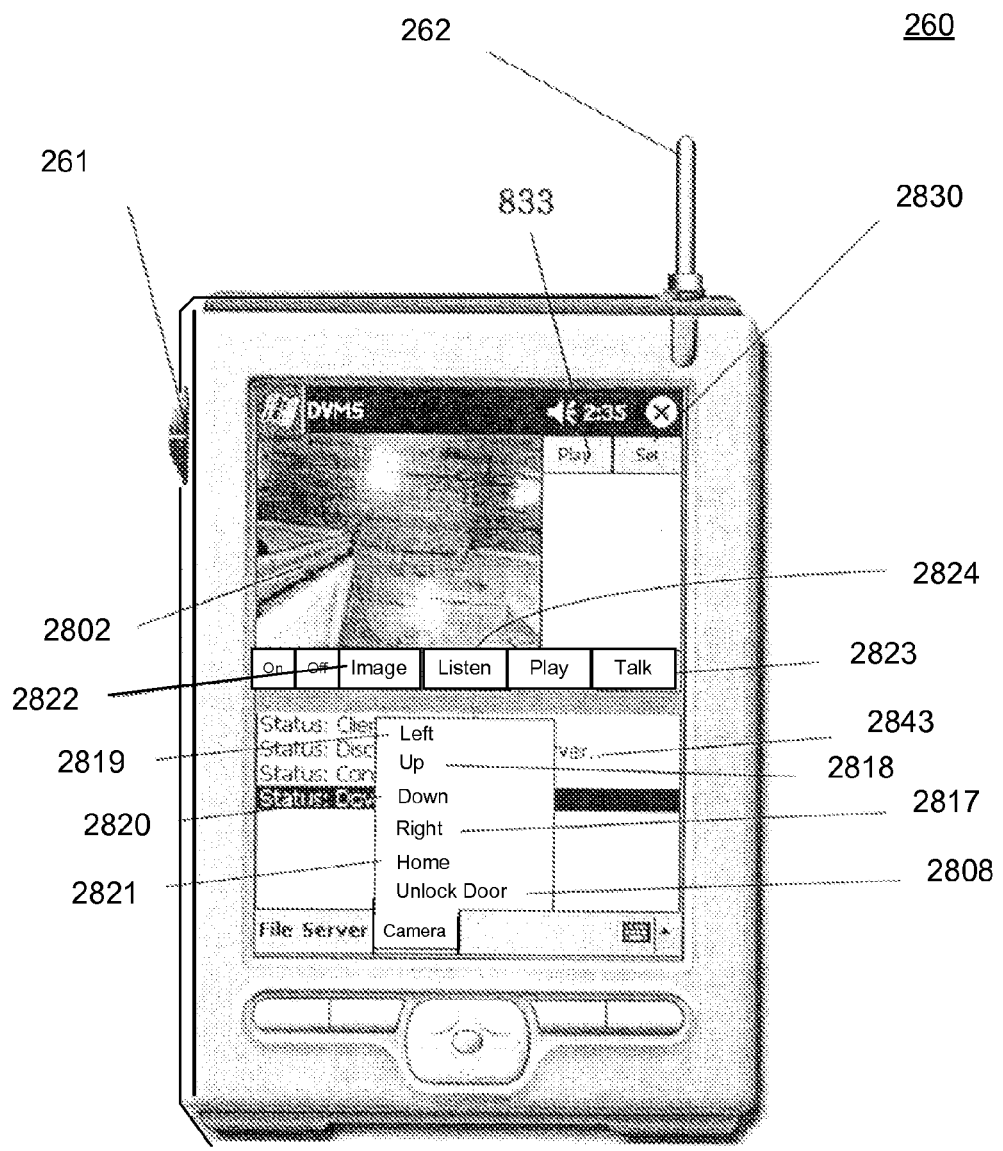

FIG. 14 is a planar view of the front of a wireless pocket PC that is connected to a wireless network, wherein a user of the wireless pocket PC is able to dynamically control the wireless network camera, view video images generated by the wireless network camera, listen and send both pre-canned and live audio files, and review archived system events in the system of FIG. 6.

V. DETAILED DESCRIPTION

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim 1tself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, one or more preferred embodiments of the present invention are next described. The following description of one or more preferred embodiments is merely exemplary in nature and is in no way intended to limit the invention, its applications, or uses.

Figure 1:
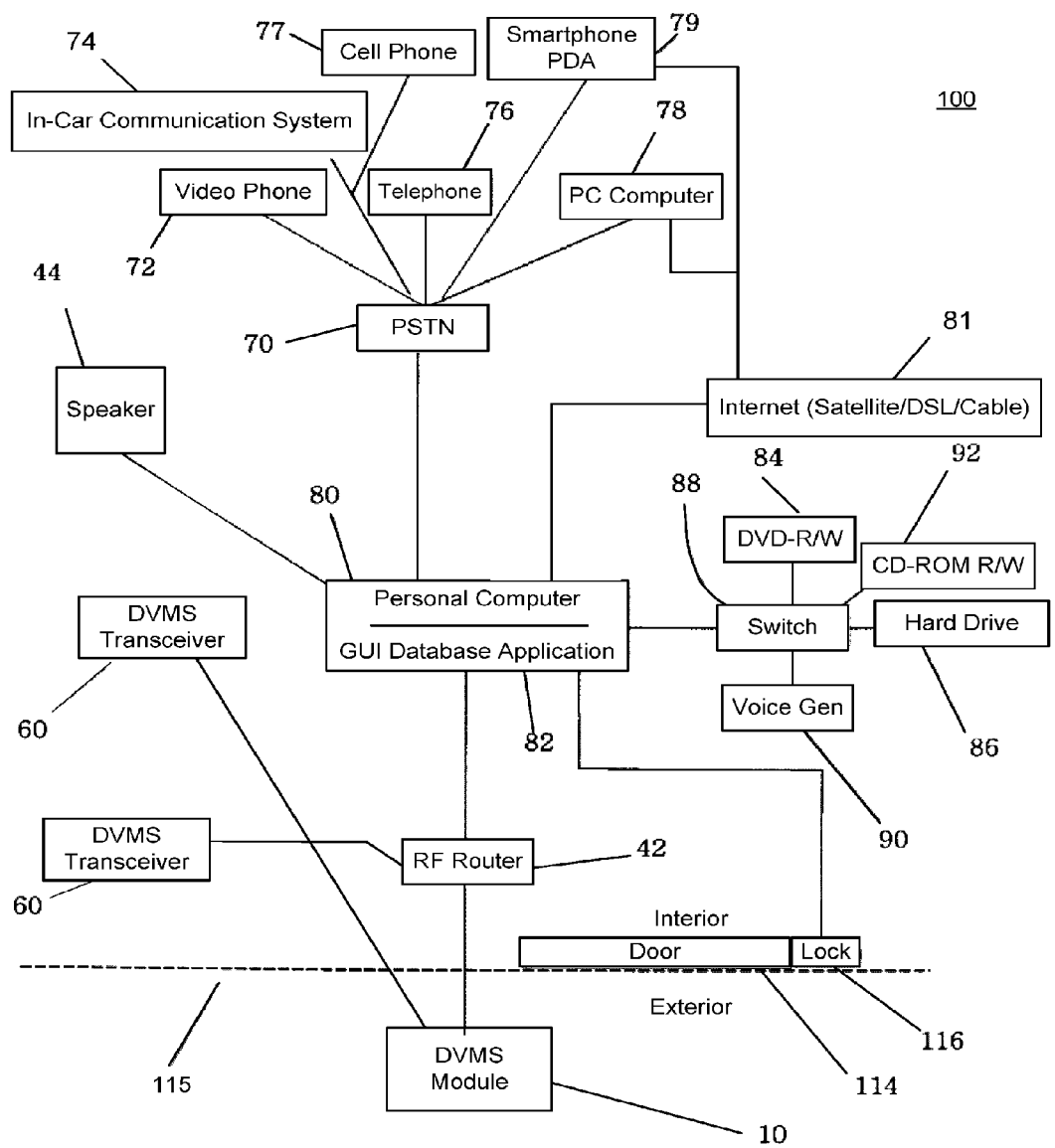
FIG. 1 is a schematic diagram of a system in accordance with a preferred embodiment of the invention.

The System of FIG. 1

FIG. 1 is a schematic diagram of a system 100 in accordance with a preferred embodiment of the invention. For purposes of providing an enabling description, the system 100 is described in the context of a door answering system for receiving a person at a home or office and is capable of controlling access to the home or office. In FIG. 1, the exterior of the home or office is differentiated from the interior by demarcation line 115, which represents a wall or other similar structure. The wall 115 includes an entrance in the form of a door 114 and an electronically actuated lock 116 for selectively locking and unlocking the door 114.

A computerized controller in the form of a personal computer 80 is disposed in the interior and is configured to selectively actuate the lock 116. The personal computer 80 preferably includes a DVD-R/W 84, a CD-ROM R/W 92, and a hard drive 86. One or more of these components 84,92,86 of the personal computer 80 preferably are utilized for recording video and audio communications that are transmitted to and from the DVMS module 10 (described in further detail below) and for playing video and audio communications that are stored via the personal computer 80.

The personal computer 80 also may include a voice generator 90 for use in generating prompts, which either exists as pre-recorded messages or are generated by a voice synthesizer. Each of these components 84,92,86,90 of the personal computer 80 may be separately disposed from the personal computer and connected, for example, by a switch 88, or may form part of the personal computer 80 and be disposed in electronic communication with a bus of the personal computer 80 within the housing thereof.

A speaker 44 is disposed in electronic communication with the personal computer 80. The speaker 44 is not shown as being wireless, but could be. Moreover, one speaker 44 is shown, but additional speakers could be used in the system 100. Furthermore, speaker 44 in FIG. 1 is represented as being separate from the personal computer 80, however, the speaker 44 could alternatively form part of the personal computer 80.

The personal computer 80 preferably is disposed in electronic communication with the Internet. The connection with the Internet preferably is accomplished by a broadband connection such as a connection 81 provided by a satellite modem, a DSL model, or a cable modem, or any combination thereof.

The personal computer 80 also preferably is connected to a public switching telephone network (PSTN) 70, which enables communication by and with the personal computer 80 via standard telephone lines.

The personal computer 80 preferably has a battery backup as well as a means for detecting a loss in electrical power such that, when electrical power is lost the battery backup will provide sufficient operating time for the personal computer 80 to notify someone responsible for the maintenance of the system that there has been a loss of electricity. Notification of the loss of electricity can be important, since the loss of electrical power can be an indication of a burglary. Additionally, if there is no electricity, then appliances, such as refrigerators, air conditioners, and heaters, cannot function and significant damage can results if the electrical failure goes undetected for a substantial period of time.

The personal computer 80 runs a software application that includes a DVMS Database Application 82 and graphic user interfaces (GUIs). The personal computer 80, in accordance with the software application, controls communication in the system 100, coordinates multiple communication devices in the system 100, and is used to define responses to prompts and events in the system 100. The DVMS Database Application 82 and its uses are described in greater detail below.

The system 100 further includes a wireless router 42 located in the interior. The wireless router 42 in FIG. 1 is represented as being separate from the personal computer 80, however, the wireless router 42 could alternatively form part of the personal computer 80. The wireless router 42 is used to establish a wireless network and is disposed in electronic communication with the personal computer 80.

The system 100 also includes a DVMS module 10 located on the exterior of the home or office proximate the door 114. The DVMS module 10 is configured for use in the exterior of the home or office, which may include outdoor use in external residential or commercial locations. The DVMS module 10 is disposed in wireless communication with the wireless network, including the personal computer 80, via the wireless router 42.

Figure 2:
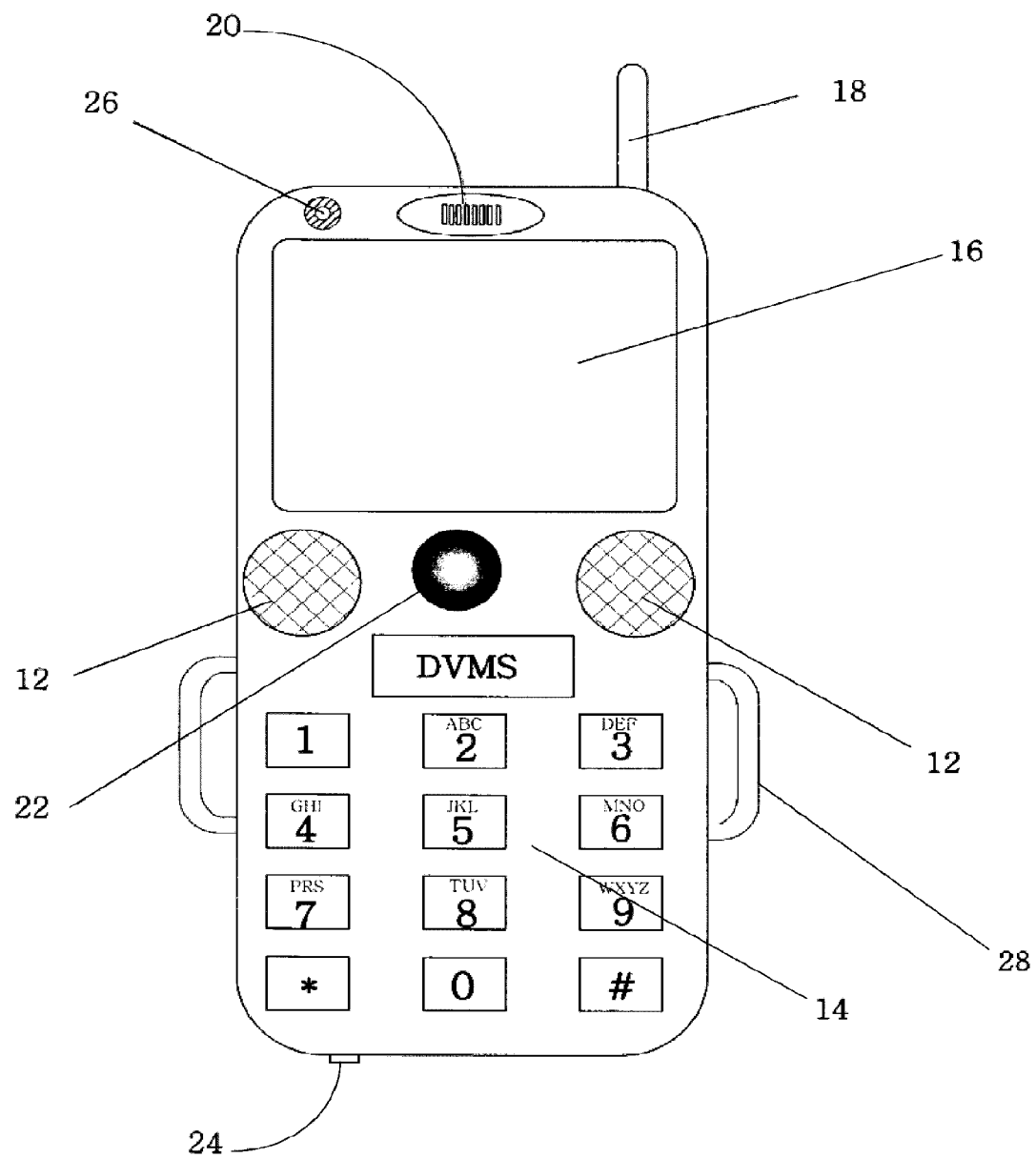
FIG. 2 is a planar view of the font of a DVMS module of the system of FIG. 1

With reference to FIG. 2, the DVMS module 10 preferably includes: a video camera 22; speakers 12; a proximity sensor 26; a microphone 20; an LCD display 16; a quick connect electrical receptacle 24; and a radiofrequency receiver/transmitter represented by antenna 18. The proximity sensor 26 activates the camera 22 upon detection of movement, which in turn relays an image or streaming video to the personal computer 80 where it is saved by the personal computer 80 in a database in association with a timestamp. Operation of the system is described in further detail below.

The DVMS module 10 optionally includes a small portable energy source, such as a battery that is rechargeable via the quick connect electrical receptacle 24, for portable use as well as for use in the event of a power failure.

The LCD display 16 screen preferably is a low energy screen reducing energy consumption. The LCD display 16 preferably comprises a touch screen and can be used to send and receive text similar to a keypad. Alternatively, or in addition thereto, the DVMS module 10 includes a keypad 14. In either case, the DVMS module 10 enables text messaging by a person at the exterior, which in turn enables a private non-audible conversation to be had and eliminates risks of eavesdropping by a passerby.

The DVMS module 10 also includes a locking mechanism 28 for receipt in a mounting holster (not shown). The locking mechanism 28 enables the DVMS module 10 to be installed securely wherever holstered, or to be moved to some other remote location, as desired. The DVMS module 10 thus is portable, much like a cell phone, and can be securely mounted and quickly connected to an electrical source.

It is anticipated that there could be multiple entrances to the home or office and, similarly, multiple DVMS modules similar to DVMS module 10 of FIG. 2 could be utilized, each disposed in wireless communication with the wireless network via the wireless router 42.

The system optional includes one or more DVMS transceivers 60. The DVMS transceivers 60 is configured for use in the interior of the home or office. As illustrated in FIG. 1, a DVMS transceivers 60 may be disposed in wireless communication with the wireless network, including the personal computer 80, and the DVMS module 10, via the wireless router 42. Additionally or alternatively, a DVMS transceivers 60 may be configured to wirelessly communicate directly with the DVMS module 10, thus bypassing communications through the wireless router 42.

Figure 3:
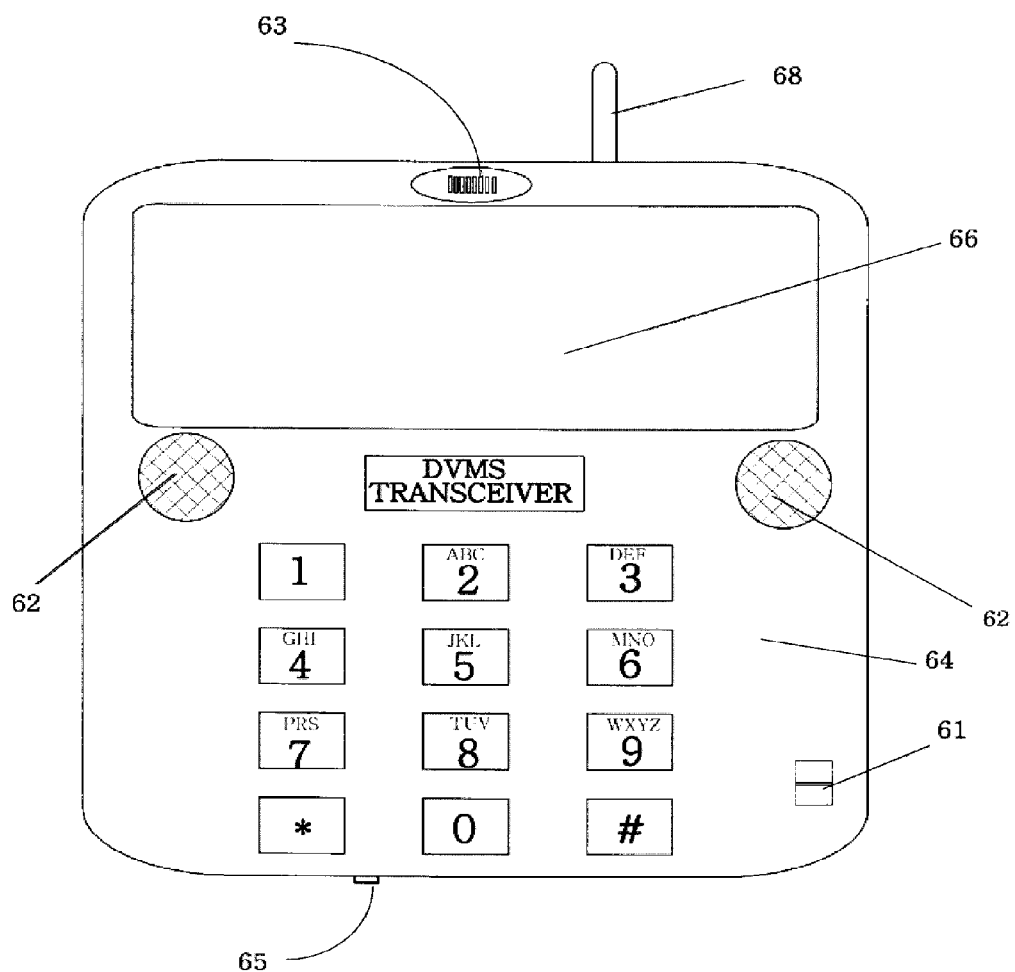
FIG. 3 is a planar view of the front of a DVMS transceiver of the system of FIG. 1.

With reference to FIG. 3, each DVMS transceiver 60 is portable and, like the DVMS module 10, the DVMS transceiver 60 communicates by short-range radiofrequency transmissions. The DVMS transceiver 60 includes: speakers 62; a microphone 63; an LCD display 66; a quick connect electrical receptacle 65; and a radiofrequency receiver/transmitter represented by antenna 68. The DVMS transceiver 60 optionally includes a small portable energy source, such as a battery that is rechargeable via the quick connect electrical receptacle 65, for portable use as well as for use in the event of a power failure. The DVMS transceiver 60 further includes a mute switch 61, which cuts-off the microphone 63, thus assuring a user of the DVMS transceiver 60 that a visitor can be monitored using the DVMS transceiver 60 without inadvertently sending an audible signal from the user.

The LCD display 66 screen preferably is a low energy screen reducing energy consumption. The LCD display 66 preferably comprises a touch screen and can be used is used to send and receive text similar to a keypad. Alternatively, or in addition thereto, the DVMS transceiver 60 includes a keypad 64. In either case, the DVMS module 60 enables text messaging by a user of the DVMS transceiver 60 with a person at the exterior using the DVMS module 10, which in turn enables a private non-audible conversation to be had and eliminates risks of eavesdropping by a passerby.

The system 100 further includes one or more remote peripheral devices. Such devices generally include video phones 72; in-car communication systems such as the well known ONSTAR system 74 currently found in GM cars; telephones 76; cell phones 77; personal computers 78; smartphones/personal digital assistants (PDAs) 79; and other similar communication devices. Each remote peripheral device is configured for electronic communication with the personal computer 80 via at least the PSTN connection 70 or the broadband connection 81.

As mentioned above, the personal computer 80 runs a software application that includes a DVMS Database Application 82 and graphic user interfaces (GUIs). The software application is configured and maintained by an administrator, who defines users thereof. The users in the system 100 are referred to as "occupants" reflecting their relation to the home or office.

Preferably, the occupants have various levels of access to the software application, depending on the privileges set by the administrator. The administrator may also set a level of security under which the system is to operate, particularly with respect to connections made using remote peripheral devices.

Other examples of configuration settings of the software application that are determined by the administrator include: aliases for a declared occupant such as, e.g., "Daddy" or "Momma"; passwords to access the software application; access codes to actuate the electronic lock controlled by the computerized controller; a number or other identifier that corresponds to an occupant's name; and at least one telephone number by which an occupant can be reached. The administrator also preferably defines a preferred hierarchy of storage of audio and video data, the location and number of backup devices, and whether replications of the database are to be kept.

Additionally, when setting up the software application, the administrator chooses, inter alia: a prompt for greeting a visitor; chooses an announcement that is to be given over a speaker within the interior when a visitor arrives; a prompt for requesting information from a visitor; a request instructing a visitor as to their choices in leaving a message or contacting a declared user; and the action that is to be performed by the computerized controller based on the input by the visitor.

The administrator also tailors the security/premise monitoring response by, inter alia: designating telephone numbers that the computerized controller calls when, for example, there is a loss of power; and designating telephone emergency numbers (e.g., telephone numbers for the police, the fire department, relatives, private security companies) that the computerized controller calls when an emergency is detected. The computerized controller also conducts self checks to confirm that all the components of the system are operational and keeps a log of the self checks, and the computerized controller preferably calls one or more designated numbers when a self check indicates a failure or otherwise improper operation.

The software application also can be configured to play background music or videos at different times of the year and/or different times of the day to reflect seasonal holidays, birthdays, and events. For instance, on Halloween the administrator may wish to have scary music and howls issuing from the DVMS module for receiving a person at that time. Furthermore, utilizing the computerized controller, the administrator can choose to use default prompts for interacting with a visitor or create customized prompts.

As hardware is added, such as the number of the DVMS modules and DVMS transceivers, the administrator can update both the network to include the additional devices and the computerized controller to accommodate the additional devices.

The software application also is configured to send voice, text, and video messages via email. The administrator can further set up redundant subsystems of the system 100.

The system 100, in use, enables secure and effective monitoring and interacting with a visitor at a residence or business, including, inter alia: the detection of the presence of a visitor at the exterior of the home or office via the proximity sensor 26, the interactive communication with the visitor, whether an occupant is present or absent from the home or office, the enablement of automated entry into the home or office by the visitor, and personalization of the process of receiving a visitor.

An exemplary method of use in the system 100 includes greeting and communicating with visitors of a business or residence. In accordance with the method, the presence of a visitor is detected via the proximity sensor 26 of the DVMS module 10, where the DVMS module 10 is mounted at or near an entrance to the business or residence. Upon the detection of the visitor by the proximity sensor 26, a message is communicated to the personal computer 80 from the DVMS module 10 indicating the detection of a visitor at the entrance. A recording is actuated by the personal computer 80, and the recording is stored in a computer-readable medium such as a database along with a beginning time-stamp. The arrival of a visitor is broadcast over a speaker within the home or office, such as speaker 44. An occupant can view the visitor on a display on the DVMS transceiver 60 or on a display of the personal computer 80, and the occupant can initiate a conversation at any time. The DVMS module 10 issues a greeting to the visitor and instructs the visitor to select a number from the keypad 14 of the DVMS module 10 in order to designate the occupant being visited. The entered number is communicated from the DVMS module 10 to the personal computer 80, where the software application confirms that the number corresponds to an occupant "y" who is "officially" present. An error message is generated if no individual corresponds to the number entered by the visitor. If no individual corresponds to the number entered by the visitor, then the visitor is prompted to select and press another number on the keypad 14 again designating the occupant being visited. The method then lists the choices again.

While this is going on, the door may be answered at any time, thereby resetting the software application to look for another visitor. The software application keeps track of the number of times a wrong number is entered and can generate a variety of responses to pranks, including calling the police, issuing warnings and/or a loud noise, or just thanking the visitor and asking him to return another time.

If appropriate, when the number designated by the visitor matches an occupant who is officially on the home or office, the speaker broadcasts that the visitor is here to see occupant "y". Occupant "y" can signal the personal computer 80 to take a message, or occupant "y" may choose to use the DVMS transceiver 60 to speak directly with the visitor, or occupant "y" can answer the door.

If appropriate, the DVMS module 10 issues a prompt stating that occupant "y" is not available and asks the visitor if they wish to speak to occupant "y" or to leave a message.

If appropriate, at any time the software application can initiate a call to occupant "y" via a remote peripheral device for communication between occupant "y" and the visitor, and the software application can record both sides of the conversation between occupant "y" and the visitor. The occupant can view the visitor or initiate a conversation, as the occupant desires. A visitor never knows where the occupant is, unless the occupant tells the visitor of the occupant's location. A visitor also never knows if the occupant can be contacted, or if the occupant has just instructed the application to take a message. Using the method the conversation or messages can be relayed to the selected occupant without the visitor ever knowing where the location of the occupant. Only the occupant can disclose such location to the visitor as desired.

If the visitor elects to leave a message, then the method prompts the visitor to begin his message and then, optionally, offers him a chance to review and approve his message. The message or call is stored in computer readable medium, such as database, by the personal computer 80 in association with a beginning timestamp and an ending timestamp along with the occupant's mailbox number. At the end of the call or message, the software application can issue a closing statement and return to background music, if programmed to do so.

When the visitor departs, and is out of the range of the proximity sensor 26, all recording is stopped and saved in the database record, along with an ending timestamp. The occupant "y" can selectively sort to view the entire recorded visit, or just the message.

If the proximity sensor 26 indicates that there is another visitor, the method cycles back to the greeting step.

If the system has an electronically actuated lock, then the method also may include the steps of checking the number entered by the visitor to determine if it is a valid access code. The electronically actuated lock may be unlocked by entering an access code either at the DVMS module 10 or remotely therefrom. If the number is valid, then the lock is actuated, and if the number is not valid, then a prompt is made requested that the code be re-entered. Optionally, the prompt may further request a number be entered that corresponds to one of the occupants if assistance is needed and, if an occupant is selected, then calling the selected occupant. The method also may include tracking how many times the wrong code is entered; checking if the maximum allowed number of wrong entries have been made; and, when the maximum number of wrong entries is reached, either automatically calling a designated party and/or removing access privileges.

An occupant preferably has the option of remotely entering the access code, thereby actuating the electronically actuated lock, or instructing the GUI database application to go to a new high security level, wherein the lock cannot be accessed and notifying the visitor that the access code is not operational.

In the method, upon the entering of a valid access code assigned to a declared occupant, the software application optionally notifies the administrator or his designated representative that the declared occupant has now entered the home or office. The administrator would know who the individual should be. The administrator thus can confirm, by remotely viewing the recorded video, that the actual person who entered the access code is the declared occupant, and/or make a follow-up telephone call to the home or office. The system 100 also provides the options of allowing the visitor to converse with the occupant, leaving a message, or calling a remote peripheral device for communication with the occupant when he is either not present or is unavailable. The entrance is recorded and time stamped for sorting or viewing either in real time or at a later date.

The system 100 further enables the administrator or a declared occupant to, at any time, to turn on a camera and view images, access the recorded video images, or post a video image from a remote peripheral device to computerized controller including associated components.

The system 100 preferably is inherently extensible in both form and function and is designed so that the system can be expanded to include multiple peripheral devices, both in direct and indirect communication with the computerized controller. Due to the use of the computerized controller and its interconnectivity, the disclosed system 100 can be configured to accommodate communications having a range of complexity.

As will be apparent from the foregoing, the system 100 provides an audio-video communication and answering system that provides real time communication between an exterior of a business or residence and an interior of the business or residence as well as a location remotely located to the business or residence.

As will be apparent from the foregoing, the system 100 provides an audio-video communication and answering system that provides real time communication between two or more rooms at a home or office and a remote location.

As will be apparent from the foregoing, the system 100 provides an audio-video communication and answering system that provides the ability to leave messages at a centralized location from a local or remote location.

In addition to the foregoing description of a method, FIG. 4 shows a block diagram illustrating an example of the use of a system of the invention as a door answering and messaging system at a residence. Furthermore, FIG. 5 shows a block diagram illustrating an example of the use of a system of the invention as a door answering and messaging system at a residence, wherein the system includes an electronically actuated lock. In the example, an occupant is attempting to gain access to the home or office.

As will now be apparent, systems in accordance with the invention achieve one or more of the foregoing benefits and features yet remain intuitive and easy to use.

In addition to the foregoing, it further is anticipated that, in certain deployments of the invention, voice recognition would be useful, particularly when the system enables access to a home or office. Voice recognition adds another layer of security, and can be used to facilitate those individuals who are unable to press a keypad. Similarly, image recognition of faces, eyes and fingerprints can also be included in the system for authentication, security, and access. The software application thus alternatively utilizes voice recognition and/or image recognition.

Furthermore, while no camera is shown located within the home or office, any number of cameras could be utilized on the interior.

It will also be appreciated that a business may be a tenant located within a building shared by other businesses. A DVMS module for the business thus would be utilized on the exterior of the business, i.e., at the "front door" of the business, which would be located within the interior of the common building.

In variations of systems of the invention, it should further be noted that one or more devices having the functionality of DVMS modules could be utilized in the interior for securing entrance to a room or group of rooms.

The System of FIG. 6

FIG. 6 is a schematic diagram of a system 2100 in accordance with another preferred embodiment of the invention. The system 2100 includes: a local area network 2200; a wireless digital camera 210; and a computerized controller in the form of a personal computer 240 (identified as the "Wireless Command Computer" in FIG. 6). The lines indicate communications between member devices and components of the system 2100 and such communications may be wired, wireless, or a combination of both wired and wireless. For purposes of providing an enabling description, the system 2100 is described in the context of a door answering system for receiving a person at a home or office and is capable of controlling access to the home or office. In FIG. 6, the exterior of the home or office is differentiated from the interior by a wall 2112 or other similar structure. The wall 2112 includes an entrance in the form of a door 2116 and an electronically actuated lock 2114 for selectively locking and unlocking the door 2116.

The personal computer 240 is disposed in the interior and is configured to selectively actuate the lock 2114. The personal computer 240 includes one or more components utilized for recording video and audio communications and for playing video and audio communications. The personal computer 240 also may include a voice generator for use in generating prompts, which either exists as pre-recorded messages or is generated by a voice synthesizer. Each of these components of the personal computer 240 may be separately disposed from the personal computer and connected, for example, by a switch, or may form part of the personal computer 240 and be disposed in electronic communication with a bus of the personal computer 240 within the housing thereof. A speaker 248 is disposed in electronic communication with the personal computer 240. Moreover, one speaker 248 is shown, but additional speakers could be used in the system 2100. Furthermore, speaker 248 in FIG. 6 is represented as being separate from the personal computer 240, however, the speaker 248 could alternatively form part of the personal computer 240.

The personal computer 240 preferably is disposed in electronic communication with the Internet. The connection with the Internet preferably is provided by a broadband connection through, for example, a wireless router 250. Such broadband connection may be accomplished by a satellite modem, a DSL model, or a cable modem, or any combination thereof. The personal computer 240 also preferably is connected to a public switching telephone network (PSTN) 70, which enables communication by and with the personal computer 240 via standard telephone lines.

The personal computer 240 preferably has a battery backup as well as a means for detecting a loss in electrical power such that, when electrical power is lost the battery backup will provide sufficient operating time for the personal computer 240 to notify someone responsible for the maintenance of the system that there has been a loss of electricity. Notification of the loss of electricity can be important, since the loss of electrical power can be an indication of a burglary. Additionally, if there is no electricity, then appliances, such as refrigerators, air conditioners, and heaters, cannot function and significant damage can results if the electrical failure goes undetected for a substantial period of time.

With regard to the wireless router 250, it is represented as being separate from the personal computer 240, however, the wireless router 42 could alternatively form part of the personal computer 240. The wireless router 42 is used, inter alia, to establish a wireless network and is disposed in electronic communication with the personal computer 240. The router 250 is WiFi compliant, and operates using a standardized protocol such as, for example, 802.11(b) and/or 802.11(g).

The wireless router 250 facilitates two-way communication over the local area network 2200 among the member devices and components of the wireless network 2200. Furthermore, the wireless router 250 preferably is disposed in electronic communication with the Internet and facilitates two-way communication between the member devices and components of the wireless network 2200 and remote devices communicating over the Internet. Such remote devices generally include video phones 275; in-car communication systems, such as the well known ONSTAR system 274 currently found in GM cars; telephones 276; cell phones 277; personal computers 278; smartphones/personal digital assistants (PDAs) 279; and other similar communication devices. Each remote device preferably is configured for electronic communication with one or more of the member devices and components of the wireless network 2200 via at least the PSTN connection 270 or a broadband Internet connection. Additionally, a remote device may be configured to communicate with one or more of the member devices and components of the wireless network 2200 via direct wireless communications with the wireless router 250 when such remote device is within communications range of the wireless router 250. Such direct wireless communications with the wireless router 250 is illustrated with the cell phone 277 in FIG. 6.

The wireless command computer includes a digital video system application ("DVS App") 242 and a monitoring application 244. The DVS App 242 provides a set of customizable operating parameters for the wireless digital camera 210. The set of digital video operating parameters may include parameters selected from the group of: a default camera position; a number of frames per second; sensitivity and threshold of a motion sensor; length of a session; frequency of motion detection; and sensitivity and threshold of the motion detector. These parameters are conveyed to the camera operation application, discussed in further detail below. The monitoring application 244 includes a camera control screen that displays the camera webpage; and an operating screen that displays a set of operating parameters. The set of operating parameters may include parameters selected from the group of: a card file for cross-referencing MAC ID'S with cameras and pocket PCs on the wireless network; paths for logging and archiving files received from the camera; camera webpage addresses; email addresses for users; telephone numbers for cell phones; a designated greeting when a motion sensor is triggered; and security parameters. The monitoring application 244 further includes an audio library screen that displays the contents of a library of pre-recorded audio files. Typically, at least one pre-recorded audio file is a greeting audio file. In the context of the system 2100, the audio file can be sent over the local area network 2200, and can include, for instance, sounds, music, voice recordings, synthesized noises, and the like. The means of generating an audio file can be a microphone that feeds to an AID converter, which creates a digital audio file, such as a wav file or MP3 file, or a voice synthesized digital audio file. The monitoring application 244 generally includes a means of generating an audio file, and a command computer website that provides a command webpage with graphic controls for reviewing archived files. The monitoring application can further include a set of monitoring parameters that define the criteria for keeping or deleting a video file in memory, wherein the criteria includes available memory on system, age of file, and priority. The monitoring application also can further include an option to designate that the digital camera transmit video and audio data to more than one member device of the wireless network, and/or to split up audio and video data to two or more member devices. This feature is desirable if, for instance, it is preferred that either audio or video not be sent, or if a network member device—for instance a cell phone—is not configured to process both audio and video data. The monitoring application 244 also can include settings for notifying one or more designated individuals or a security service if an alarm is activated or if a predetermined condition is otherwise detected by a sensor. Such sensors may include, for example, smoke detectors, carbon monoxide detectors, laser beam detectors, broken window detectors, temperature detectors, radiation detectors, radon detectors, open window, door detectors, or a combination thereof. Moreover, such sensors may communicate via the local area network 2200.

The system 2100 includes a wireless digital camera 210 located on the exterior of the home or office proximate the door 2116. The wireless digital camera 210 includes a website application 246 and a camera operation application 247. The wireless digital camera 210 is shown in further detail in FIGS. 7-9. The wireless digital camera 210 preferably creates a series of images that are stored as a series of jpeg files which are displayed on a webpage of a website application 246 that is unique to a given camera 210. The camera 210 also includes a microphone 218, and the sound recorded by the microphone is digitized as an audio file, such as a .wav file or an MP3 file, that is transmitted along with the video as an audio file. This camera 210 preferably has a splash resistant body 225, a lens cover 238 over lens 216, and a wireless transceiver for audio 2-way audio communication. Furthermore, this camera 210 can pan, tilt, or move to a pre-set position. The camera 210 includes a motion sensor that triggers video recording with surveillance image quality, refreshing its image 30 frames per second, and includes a charge coupled device sensor to compensate for low light conditions. Communications via the wireless camera 210 also preferably are encrypted. The splash resistant body 225 allows the camera 210 to be used indoors or outdoors. The camera 210 also supports IPv6 (Internet Protocol Version 6). The audio feature of the camera 210 uses a Java applet that is installed during the installation. The camera 210 has a memory card 222 that is protected by a sealing door 224, a proximity detector or motion sensor 220, a microphone 218, a power input 226, an external microphone port 230, a LAN port 236, and a speaker port 232. The illustrated camera 210 has four mounting legs 234 and a mounting stand hole 235. The antenna 214 projects from the rear of the camera. A suitable wireless digital camera that has weather resistance is the camera currently sold in the United States by Panasonic under the part number BB-HCM371.

Every camera in the system 2100 preferably can be uniquely identified by a media access control (MAC) address that enables the personal computer 240, and each device in the system 2100 having a web browser, such as, e.g., a Windows Internet Explorer browser, or a Firefox browser, to be in wireless communication with camera 210 through the wireless router 250. While only one camera 210 is shown in FIG. 6, multiple cameras can be included in the system 2100, each with its own unique website accessible by multiple devices in the system 2100 having Internet browsers. In addition to displaying the video and audio on the camera's webpage, the website application 246 of the camera 210 displays graphic controls for actuating the camera 210, such as panning right and left, up and down, zoom in and zoom out, and adjustments for the amount of ambient light. These controls are illustrated in FIG. 11.

As previously stated, the camera 210 has a motion sensor 220 for detecting the presence of a person or a moving object with an adjustable level of sensitivity and a trigger threshold for initiating video recording, and, optionally issuing a verbal response, such as a greeting. The verbal response is an audio file, which can reside in the camera's memory as well as in the personal computer, in which case the verbal response can be transmitted, via the local area network 2200, to the camera 210. The camera 210 typically has a pre-set or default position, which can be static or dynamic. For instance, the camera 210 can be programmed to pan back and forth through a pre-set cycle or to zoom in and out, or any combination thereof. The motion sensor 220 has parameters for setting the sensitivity and a trigger threshold for initiating video recording. Upon initiation, the camera automatically starts recording video, which is displayed on the camera webpage in the form of video images, typically in serial form. The recording further can be transmitted to the personal computer 240 for saving for later viewing. In an alternative embodiment, the camera does not include a motion sensor 220 in the form of an additional piece of hardware but, instead, detects motion via a software application that analyzes the video images. In this alternative, the camera 210 records images on a routine basis and, when motion is detected, a video recording is initiated and a verbal response optionally is provided. Such software can be executed at the personal computer 210 or can be executed at the camera 210 and form part of the camera application 247.

The website application 246 of the digital camera 210 provides a webpage with graphic controls for operating the camera and a viewing area for viewing video images. When activate for recording the camera 210 provides digital video images that are displayed on the webpage. The camera 210 can be activated manually or self-activated by the motion sensor 220 that detects the presence of a person or a moving object. The motion sensor 220 has an adjustable level of sensitivity and a trigger threshold for initiating video recording. The camera 210 has a memory cache for saving a designated number or series of transmitted video images. Typically, when activated for video recording, the camera also activates audio recording, which provides audio files on the webpage generated by the digital camera's microphone 218. The camera 210 also includes means including the speaker 218 for playing received audio files.

Referring to FIG. 10, the screen 2200 for setting the parameters of the DVS application 242 is illustrated. Communications over the local area network 2200 between the camera 210 and command computer 240 are established using a MAC address of the camera 210 and/or an IP address 2224 for the camera. The default port 2226 for communications is 80. The camera 210 recognizes an encrypted username and password 2202. The DVS application 242 encrypts the username 2224 and the password 2222, using the generator 2203, resulting in the encrypted version 2202. The hierarchical structure of the member devices of the wireless network is defined in 2220, 2219 and 2205. The command computer 240 designated is named "Server", as shown in the Username textbox 2221. The client port for uploading audio files 2219 is given as port 5999. An example of a client is a pocket PC 260 or cell phone 277 having a web browser. The listener port 2205 for down loading audio files is port 5998. The camera 210 has access to the audio files in a network-shared folder having a designated path 2220. When a greeting/verbal response is triggered by the motion sensor 220, the file is read from the shared folder 2220. Audio files received by the command computer 240 from the camera 210 are saved in the audio capture folder 2218. The received audio files can be accessed by the client, pocket PC 260, or cell phone 277, as well as the command computer 240. The door reset time 2216 is a parameter that designates the length of time in seconds that must pass after the motion sensor 220 no longer detects a visitor before a recording is stopped. The door audio record timer 2212 is the length of a visitor's message in seconds. The default video archived frames 2209 is the number of images or frames that are saved as an archived file. The archived video file 2216 can be played back at various speeds. The archived video loop frame rate 2216 is in frames per millisecond. Recall that the camera is capable of generating 30 frames, or 30,000 frames per millisecond. This feature 2216 allows the video to be slowed down. If the administrator wishes to cut off archiving audio files, the administrator can select this in box 2213. If the administrator wishes to cut off archiving video files, the administrator can select this in box 2209. The audio files can be turned off completely by using the audio playback parameter 2215. The DVS application 242 can be set to send a message to a cell phone or another computer. The phone email trigger 2207 sets this parameter, and the email address is entered into phone email address parameter 2207. The DVS enables different greetings/verbal responses to issue depending on pre-set criteria. The time of day is one criterion. As shown in FIG. 10, there are three audio files: "cats.wav" 2208*a*, "creek.wavn 2208*b* and "dracwelcome.wav" 2208*c*, each of which will be triggered depending on the time of day. Pairs of boxes 2210*a* are set from 7 to 12, text boxes 2210*b* are set from 13 to 17, and text boxes 2210*c* are set from 18 to 6. At 13 hours, or 1 PM, the greeting switches from "cats.wav" 2208*a* to "creek.wavfl 2208*b*, and at 6 PM the greeting switches from "creek.wav" 2208*b* to "dracwelcome.wav" 2208*c*. As will be discussed below, additional options also exist for playing the audio files.

As shown in FIG. 11, the camera's webpage is incorporated as a screen in the monitoring application 244 of the wireless command computer 240. In the screenshot of the monitoring application 2300 of FIG. 11, the lower main screen 2301 displays the camera webpage. The camera webpage is comprised of the streaming video images 2301, an icon 2322 for taking a snapshot, an icon 2323 enabling the user to talk via the camera using the command computer's microphone, an icon 2324 enabling the user to hear sound picked up by the camera's microphone 218, and icon 2325 enabling the user to zoom in and out. Additionally the webpage has graphic controls for remotely positioning the camera, adjusting brightness and automatic panning. The cross-shaped icon on the side has left arrow 2319 for turning the lens left, a right arrow 2317 for turning the lens right, an up arrow 2318 for turning the lens up, a down arrow 2320 for turning the lens down, and a center button 2321, which returns the camera to its default position. On the bottom of the webpage is an icon 2310*a* for increasing the brightness when the light is low, and icon 2310*b* for decreasing the brightness when the light is high. Icon 2312 sets the brightness to the default position, and icon 2316 is a reset button that returns all parameters to the factory settings. The camera automatically pans back and forth when button 2313 is clicked, and pans up and down when button 2315 is clicked. Panning is stopped by re-clicking the pan icons. The double curved arrow icon 2316 refreshes the camera controls. The audio library screen 2330 contains a list of all the currently recorded audio files. A scroll bar 2331 enables the user to quickly move down the list. To play a selection, a file is selected with the cursor, and then arrow icon 2332 is clicked. The check icon 2333 designates a file as a greeting/verbal response file. The square icon 2334 is the stop button, the plus icon 2335 initiates a module for adding a new audio file, the X icon 2336 deletes a selected audio file, the double arrow icon 2337 causes all checked audio files to be played in random order, and the icon 2338 is a reset button. The top screen 2308 contains a number of options, including starting and running the DVMS service. Large button 2341 turns the program off when clicked, and on when clicked again. Clicking on the lock icon 2342 actuates the door lock. Screen 2343 contains information about what is occurring at the camera, and other system performance information. Drop down icon 2344 opens a dialog box mapping all the sounds and multimedia properties. Drop list icon 2345 displays a list of input devices, such as the microphone on the command computer 240, when talking directly to the camera 210, which needs to be selected to conduct real time conversations. The connected devices screen 2351 displays a list of the wireless network deices, and whether they are currently available. The archives button 2346 activates a screen that lists all the archived video and audio files, and a timestamp for when they were created. The options button 2347 activates the DVS screen 2200 for configuring the application.

The camera has a software package that is run when initializing a new or an addition camera, where communication is established using the MAC address and the subsequent assignment of an IP address. Clicking the camera button 2348 starts that software. The about button 2349 has general information about the version of the DVMS system and contact information. The status button 2350 clears screen 2351.

When recording an audio file, the user can use a synthesizer module or voice recording module. The synthesizer module is a dialog box 2400 shown in FIG. 12, and the voice recording module is a dialog box 2500 shown in FIG. 13. The synthesizer module and the voice recording modules are Microsoft open source modules. In the voice synthesizer module, text is entered into screen 402 and then saved in path 404. An animated character/agent pops up on the command computer when the audio file is played, and characteristics of the agent are selected using screens 2406, 2408, 2410. For instance, a wizard can be selected as the MS Agent, and the wizard flies quickly, and speaks loudly with a low pitch. In FIG. 13, the user can record his or another's voice, or some sound, music, or other audible sound.

The local area network 2200 optionally includes one or more portable devices such as the pocket PC 260 represented in FIG. 6 and shown in detail in FIG. 14. The pocket PC 260 is configured with a client DVMS application. The pocket PC 260 is wireless, having antenna 262 that communicates with the personal computer 240 and the wireless digital camera 210 via wireless modem 250. Similar to the personal computer 240, the pocket PC 260 includes a display screen 2802 for viewing streaming video from the digital camera 210, an "Image" icon 2822 for saving a snapshot, a listen icon 2824 which plays audio from the camera, and a talk icon 2823 for transmitting audio to the camera. The audio volume is adjusted using thumb wheel 261. The pocket PC 260 further includes controls for pointing the camera in the desired direction including: menu selection 2819 for left, menu selection 2818 for up, menu selection 2817 for right, menu selection 2820 for down, and menu selection 2821 to return to the camera 210 the default position. The door lock is unlocked for access using menu selection 2808, which transmits an access code in the form of text to the locking mechanism 2114. The lower screen 2843 displays the status of member devices in the local area network 2200. The library of audio files is accessible through the set button 2830, and the play button 2833 selects the audio file to be played.

While not explicitly shown, it is anticipated that the system 2100 may include voice recognition and image recognition for additional security in authentication and access.

The system provides the options of allowing the visitor to converse with the occupant, leave a message, or call a remote peripheral device for communication with the occupant when he is either not present or unavailable. The visit is recorded and time stamped for sorting or viewing either in real time or at a later date. The system achieves these features, while still presenting a system that is intuitive and easy to use. The digital video monitoring system is extensible, scalable, and flexible in that the number of members of the wireless network can be readily expanded, the system provides and audio and video record of events, and a number of the components are currently off-the-shelf computerized devices that can be configured for the system. Finally, the system allows the users to achieve a high level of security and anonymity.

As will be apparent from the foregoing, the system 2100 enables wireless audio-video communication by all the member devices with each digital camera and the command computer; the system 2100 enables the option of having a visitor converse with an occupant, leave a message, or contact a remote device for communication with a member of the network that is offsite; the system 2100 enables a wireless digital camera to generate and audio and video recording of a visitor upon the sensing that a visitor is proximate the door, with the recording being viewed in real time, or at a later time, either locally or remotely; the system 2100 is highly extensible and can be easily adapted to control many cameras, the images of which can be simultaneously viewed by multiple individuals by merely browsing the individual camera's website that is unique to each camera. The system 2100 also is highly scalable due to the incorporation of a wireless network in the local area network 2200; the system 2100 enables an alarm and or automated calls to designated institutions and individuals when there is a security breach detected; the system 2100 allows users having the proper privileges to remotely permit entrance to a building; the system 2100 can be customized to reflect holidays, special occasions, and various levels of security.

Based on the foregoing description, it will be readily understood by those persons skilled in the art that the invention is susceptible of broad utility and application. Many embodiments and adaptations of the invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the invention has been described herein in detail in relation to one or more preferred embodiments, it is to be understood that this disclosure is only illustrative and exemplary of the invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the invention being limited only by the claims appended hereto and the equivalents thereof.

What is claimed is:

1. A communications and monitoring system, comprising:
   (a) a wireless device associated with a door and configured to communicate audio and video data;
   (b) a plurality of peripheral devices, each peripheral device associated with a respective user; and
   (c) a computer configured for communication with the wireless device and configured for communication with each of the peripheral devices;
   (d) wherein the computer executes software, in accordance with which,
      (i) the association of each of the peripheral devices with a respective user is maintained,
      (ii) audio and video data from the wireless device is received by the computer, and
      (iii) a graphical user interface is provided through which audio and video data from the wireless device is accessible by each respective user using one of the peripheral devices.

2. The communications and monitoring system according to claim 1, wherein the wireless device includes a camera, a microphone, a speaker, an RF transmitter, and an RF receiver.

3. The communications and monitoring system according to claim 2, wherein the wireless device further includes a proximity sensor.

4. The communications and monitoring system of claim 1, wherein, in accordance with the software, audio and video data received from the wireless device is recorded, and access to the recorded audio and video data is provided through the graphical user interface.

5. The communications and monitoring system according to claim 4, wherein the audio and video data is recorded to a storage device selected from the group of a CD-ROM R/W, a DVD R/W, a camera card, a tape drive, and a hard drive.

6. The communications and monitoring system according to claim 1, wherein, in accordance with the software, the computer associates one of various levels of access privileges to each user.

7. The communications and monitoring system of claim 1, wherein, in accordance with the software, the computer contacts a particular one of the users by sending a communication to the respective peripheral device associated with that user.

8. The communications and monitoring system of claim 1, wherein, in accordance with the software, the computer facilitates audio communications between a person using the wireless device, and a particular one of the users, by initiating communications with the respective peripheral device associated with that user.

9. The communications and monitoring system of claim 1, wherein the computer is configured for communication, via the Internet, with one or more of the plurality of peripheral devices such that audio and video data from the wireless device is remotely accessible via the Internet by a respective user using one of the peripheral devices.

10. The communications and monitoring system of claim 1, wherein the computer is configured for communication, via a public switching telephone network, with one or more of the plurality of peripheral devices such that audio and video data from the wireless device is remotely accessible via the public switching telephone by a respective user using one of the peripheral devices.

11. The communications and monitoring system of claim 1, wherein the computer is configured for communication, via a local area network, both with the wireless device and with one or more of the plurality of peripheral devices such that audio and video data from the wireless device is accessible via the local area network by a respective user using one of the peripheral devices.

12. The communications and monitoring system of claim 1, wherein the plurality of peripheral devices each comprises a digital communication device.

13. The communications and monitoring system of claim 1, wherein at least one of the plurality of peripheral devices comprises a cell phone, telephone, video-cell phone, computer, personal digital assistant, video-personal digital assistant, satellite telephone, or pager.

14. The communications and monitoring system according to claim 1, wherein the wireless device and at least one of the peripheral devices are configured for communications via text messaging.

15. The communications and monitoring system of claim 1, wherein the wireless device is portable, has a locking mechanism, and an electrical receptacle for quickly attaching to a source of electricity, and wherein the wireless device further includes a portable energy source.

16. The communications and monitoring system according to claim 1, wherein the computer comprises a module for authenticating a user based on a biometric of the user.

17. The communications and monitoring system according to claim 1, wherein the biometric comprises at least one of the group of a user's face, eye, voice, and fingerprint.

18. The communications and monitoring system according to claim 1, wherein the computer comprises a voice-generation apparatus.

19. A communications and monitoring system, comprising:
- (a) a wireless device associated with a door and configured to communicate audio and video data;
- (b) a plurality of peripheral devices, each peripheral device associated with a respective user; and
- (c) a computer configured for communication with the wireless device and configured for communication, via the Internet, with each of the peripheral devices;
- (d) wherein the computer executes software, in accordance with which,
    - (i) the association of each of the peripheral devices with a respective user is maintained,
    - (ii) audio and video data from the wireless device is received and stored by the computer,
    - (iii) a graphical user interface is provided through which audio and video data from the wireless device is accessible, via the Internet, by each respective user using one of the peripheral devices, and
    - (iv) each user is authenticated based on a biometric of the user.

20. A communications and monitoring system, comprising:
- (a) a wireless device associated with a door and configured to communicate audio and video data, the wireless device including a camera, a microphone, a speaker, an RF transmitter, and an RF receiver;
- (b) a plurality of peripheral devices, each peripheral device associated with a respective user; and
- (c) a computer configured for communication with the wireless device and configured for communication via the Internet with each of the peripheral devices;
- (d) wherein the computer executes software, in accordance with which,
    - (i) the association of each of the peripheral devices with a respective user is maintained,
    - (ii) audio and video data from the wireless device is received by the computer,
    - (iii) a graphical user interface is provided through which audio and video data from the wireless device is accessible via the Internet by each respective user using one of the peripheral devices, and
    - (iv) audio and video data received from the wireless device is recorded, and access to the recorded audio and video data is provided through the graphical user interface.

* * * * *